(12) United States Patent
Tanaka

(10) Patent No.: US 6,337,883 B1
(45) Date of Patent: Jan. 8, 2002

(54) METHOD AND APPARATUS FOR SYNCHRONOUSLY REPRODUCING AUDIO DATA AND VIDEO DATA

(75) Inventor: Mitsumasa Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/329,340

(22) Filed: Jun. 10, 1999

(30) Foreign Application Priority Data

Jun. 10, 1998 (JP) ............................................. 10-162300

(51) Int. Cl.[7] .................................................. H04N 7/12
(52) U.S. Cl. ..................................... 375/240.25; 386/98
(58) Field of Search .............................. 386/39, 33, 96, 386/98, 104–166, 111, 112; 348/423.1; 375/240.01, 240.25, 240.28; H04N 7/12

(56) References Cited

U.S. PATENT DOCUMENTS

| | | | | |
|---|---|---|---|---|
| 5,502,573 A | * | 3/1996 | Fujinami | 386/98 |
| 5,594,859 A | * | 1/1997 | Palmer et al. | 395/330 |
| 6,130,987 A | * | 10/2000 | Tanaka | 386/94 |

FOREIGN PATENT DOCUMENTS

| | | |
|---|---|---|
| JP | 6-343065 | 12/1994 |
| JP | 8-212701 | 8/1996 |
| JP | 8-214296 | 8/1996 |
| JP | 8-251543 | 9/1996 |
| JP | 8-322043 | 12/1996 |

\* cited by examiner

*Primary Examiner*—Nhon T Diep
(74) *Attorney, Agent, or Firm*—Sughrue Mion, PLLC

(57) ABSTRACT

An apparatus for synchronously reproducing a video data and audio data includes a separating section, an audio data processing section, a video data processing section, and a synchronization processing section. The separating section separates a multiplexed compressed audio and video data into a compressed video data and a compressed audio data. The audio data processing section expands the compressed audio data to reproduce an audio data from the expanded audio data, and outputs the audio data to the synchronization processing section. The video data processing section expands the compressed video data in response to a control signal to reproduce a video data from the expanded video data, and outputs a signal indicative of each of frames, and a signal indicative of each of time stamps to the synchronization processing section. The synchronization processing section calculates a frame rate based on the audio data supplied from the audio data processing section, and the frame signal and the time stamp signal supplied from the video data processing section, and outputs the control signal to the video data processing section based on the calculated frame rate without using a frame rate written in the video data.

4 Claims, 5 Drawing Sheets

FRAME DATA (24 FRAMES/SEC.)

↓ 3:2 PULL DOWN

FIELD DATA (60 FIELDS/SEC.)

FRAME DATA (30 FRAMES/SEC.)

METHOD AND APPARATUS FOR SYNCHRONOUSLY REPRODUCING AUDIO DATA AND VIDEO DATA

BACKGROUND OF THE INVENTION

1. Field of the Invention

The present invention relates to a method and apparatus for synchronously reproducing a compressed audio data and video data.

2. Description of the Related Art

Conventionally, as a reproduce technique of a video data and an audio data, there is known an audio data and video data reproducing system, in which the audio data and video data which have been digitally coded and compressed, like an MPEG (Moving Picture Expert Group) data are respectively expanded. In this system, the synchronization between the audio data and the video data (to be referred to as AV synchronization, hereinafter) is generally controlled, using time stamps which are written in the data.

However, there is a case that it is not possible to perform the AV synchronization control correctly in accordance with the time stamps which have been written in the data, when a time resolution of the reproducing system is low.

In order to avoid such a problem, the following method is proposed. That is, an audio reproduction time is calculated from a bit rate which has been written in the audio data, and a reproduce byte count. The number of frames to be outputted till the present time after the start of the reproduction is calculated based on the calculated audio reproduction time and the frame rate which has been written in the video data. The calculated number of frames and the number of frames which have been actually outputted are compared with each other and the AV synchronization is controlled based on the comparing result.

Also, a 24-frame/sec data such as a movie data shown in FIG. 1A is converted into a 60-field/sec data of the NTSC system shown in FIG. 1B by the known 3:2 pull down. In this case, a frame rate of 30 frames/sec is written in the converted data. The converted data by the 3:2 pull down has been processed to be reproduced in an interlace display mode. The converted data is converted into the data of a frame structure shown in FIG. 1C, and displayed in the frame rate of 30 frames/sec which has been written in the data, when being reproduced in the non-interlace display mode.

However, when the data expanding process of a data and the AV synchronization control are realized with a software, a great deal of time is spent on the video data processing, if a CPU and a graphic process in the reproducing system are not highly efficient. Therefore, it is necessary to frequently perform the intermittent removal of the frames for control of the AV synchronization.

In order to avoid this problem, it could be considered that the data of the field structure is not expanded in the 30 frames/sec but in the original 24 frames/sec. In this case, the frame rate which has been written in the video data and the actual frame rate are different from each other. Therefore, the time stamps which have been written in the data must be used for the AV synchronization.

In conjunction with the above, a video and audio data reproducing system is disclosed in Japanese Laid Open Patent application (JP-A-Heisei 8-251543). In this reference, time data for a video data and an audio data are calculated in units of frames based on a frame update data and a frame rate data. The time data are compared with each other to determine whether the reproduction of the video data proceeds more than that of the audio data.

Also, an MPEG system decoder is disclosed in Japanese Laid Open Patent applications (JP-A-Heisei 8-212701 and JP-A-Heisei 8-214296). In this reference, reproduction times are set based on decoding operation times of decoders (2, 3) and SCR and PTS for each register (11, 21). The PTS is read out from each register and transferred to a corresponding control circuit. Bit streams are transferred from bit buffers to decode core circuits (13, 23). Each of the control circuit calculates the reproduction time based on the decode operation time of the decoder, and SCR and PTS.

A signal processing method is described in Japanese Laid Open Patent application (JP-A-Heisei 6-343065). In this reference, a decoding system for a compressed vide signal and a compressed audio signal includes a local access unit counter for a digital AV application. An access unit header is generated and lost due to a storage media error or a transmission error there. A value called an access unit count is included in each of elementary streams to suppress the generation of an AV sync error. The value is stored in a register (238, 244). An encoder (228, 230) detects the loss of the access unit header or an error of that to correct AV synchronization.

SUMMARY OF THE INVENTION

Therefore, an object of the present invention is to provide a method and apparatus for synchronously reproducing an audio data and video data, in which AV synchronization control of the audio data and the video data can be performed without using a frame rate which has been written in the video data, when the audio data and video data which have been digitally compressed, like an MPEG data, are expanded and reproduced, respectively.

In order to achieve an aspect of the present invention, an apparatus for synchronously reproducing a video data and audio data, includes a separating section, an audio data processing section, a video data processing section, and a synchronization processing section. The separating section separates a multiplexed compressed audio and video data into a compressed video data and a compressed audio data. The audio data processing section expands the compressed audio data to reproduce an audio data from the expanded audio data, and outputs the audio data to the synchronization processing section. The video data processing section expands the compressed video data in response to a control signal to reproduce a video data from the expanded video data, and outputs a signal indicative of each of frames, and a signal indicative of each of time stamps to the synchronization processing section. The synchronization processing section calculates a frame rate based on the audio data supplied from the audio data processing section, and the frame signal and the time stamp signal supplied from the video data processing section, and outputs the control signal to the video data processing section based on the calculated frame rate without using a frame rate written in the video data.

In this case, the synchronization processing section includes a time stamp monitoring section calculating a time difference between the two time stamps, a frame difference counter counts a number of frames between the two time stamps, a calculating section calculating the frame rate from the number of frame difference and the time difference, and a control section outputting the control signal to the video data processing section based on the calculated frame rate.

In order to achieve another aspect of the present invention, a method of synchronously reproducing a video data and audio data, includes:

separating a multiplexed compressed audio and video data into a compressed video data and a compressed audio data;

expanding the compressed audio data to reproduce an audio data from the expanded audio data;

a video data processing section expanding the compressed video data in response to a control signal to reproduce a video data from the expanded video data;

generating a signal indicative of each of frames, and a signal indicative of each of time stamps;

calculating a frame rate based on the audio data, the frame signal and the time stamp signal; and generating the control signal based on the calculated frame rate without using a frame rate written in the video data.

DESCRIPTION OF THE PREFERRED EMBODIMENTS

An audio data and video data synchronously reproducing apparatus of the present invention will be described with reference to the attached drawings.

Figure 1A:
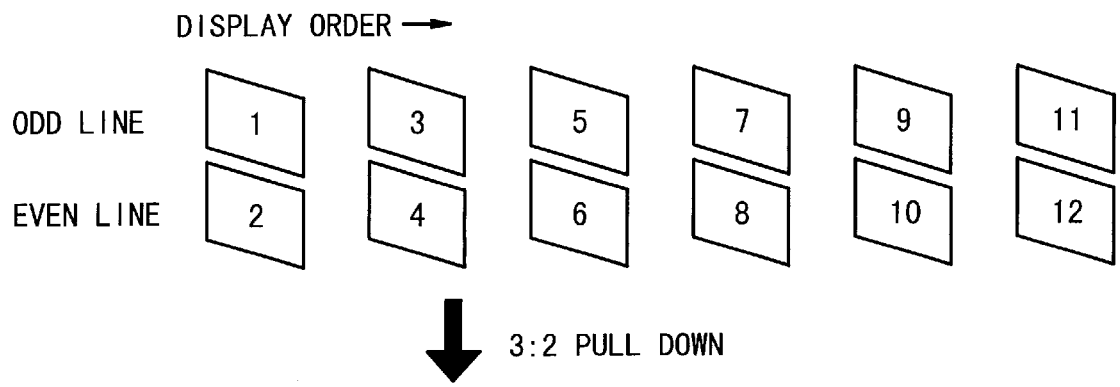
FIGS. 1A to 1C are conceptual diagrams of a 3:2 pull down process.
Figure 1B:
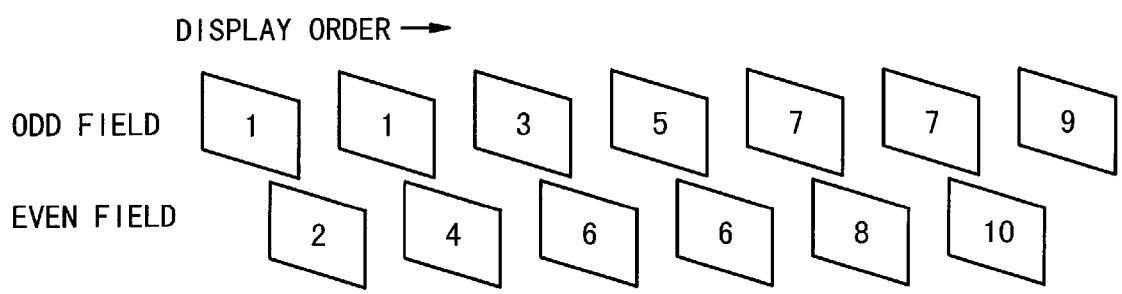
Figure 1C:
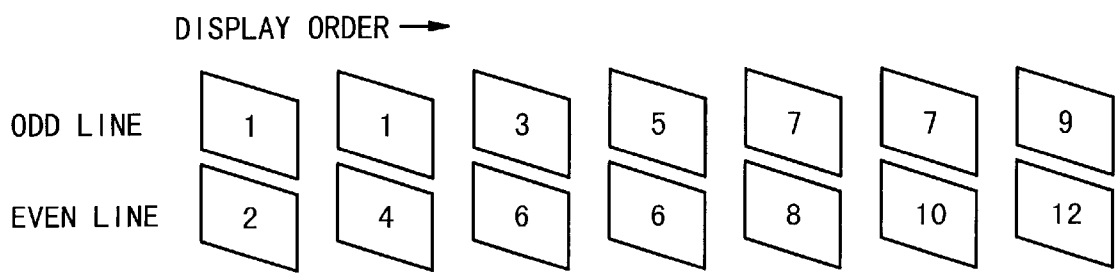
Figure 2:
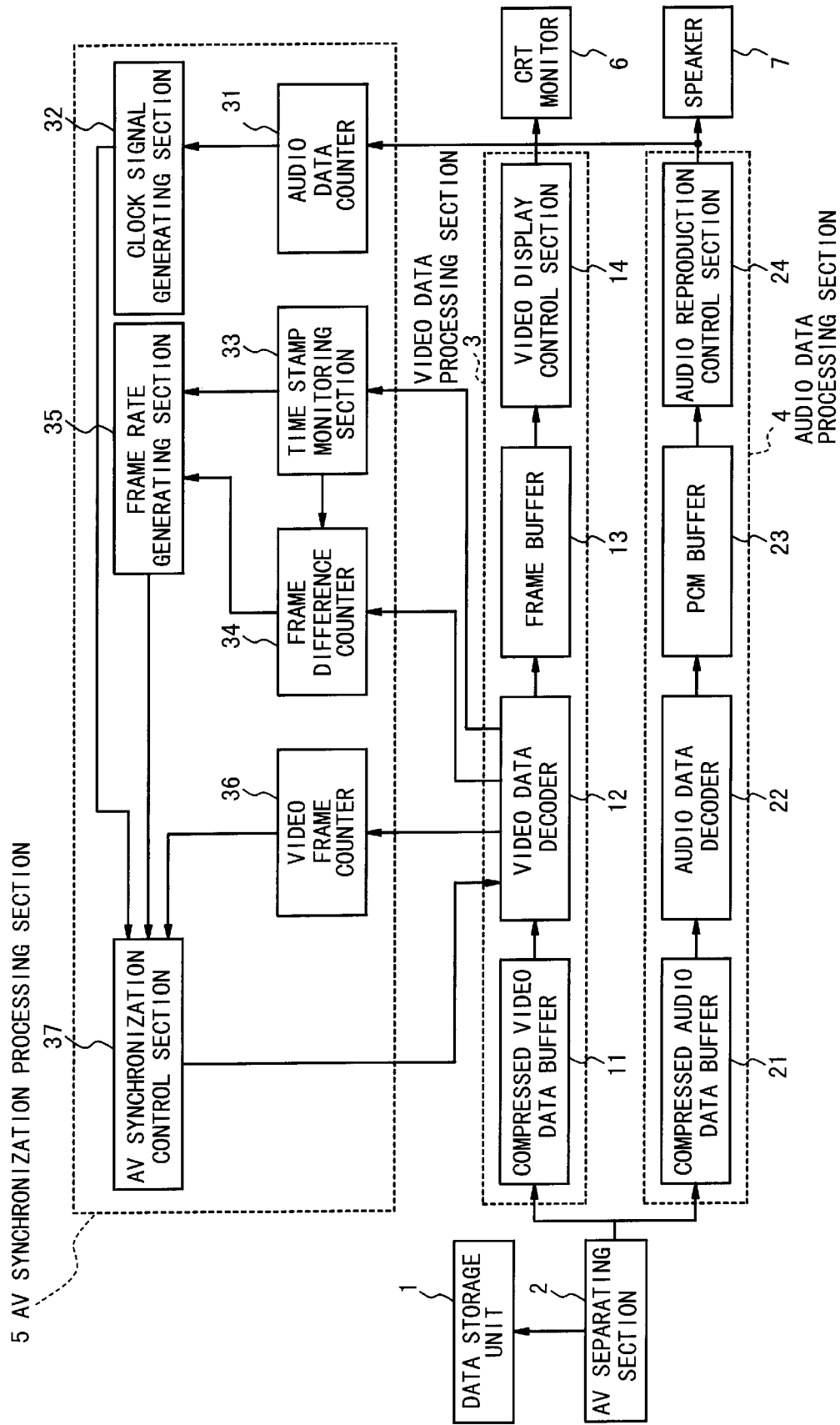
FIG. 2 is a block diagram illustrating the system configuration of an apparatus for synchronously reproducing an video data and audio data according to an embodiment of the present invention.

FIG. 2 is a block diagram illustrating the structure of the audio data and video data synchronous reproduction apparatus according to an embodiment of the present invention. Referring to FIG. 2, the audio data video synchronous reproduce apparatus of the present invention is composed of a data storage unit 1 as a data recorder, an AV separating section 2, a video data processing section 3, an audio data processing section 4, an AV synchronization processing section 5, a CRT monitor 6 and a speaker 7.

The data storage unit 1 stores an audio data and an video data which have been digitally coded and compressed. The AV separating section 2 reads out a multiplexed compressed data from the data storage unit 1 to separates into a compressed audio data and a compressed video data. The video data processing section 3 performs an expanding process of the compressed video data supplied from the AV separating section 2. The audio data processing section 4 performs an expanding process of the compressed audio data supplied from the AV separating section 2. The AV synchronization processing section 5 performs an AV synchronization control. The CRT monitor 6 displays the expanded video data and the speaker 7 reproduces the expanded audio data.

The video data processing section 3 is composed of a compressed video data buffer 11, a video decoder 12, a frame buffer 13, and a video display control section 14. The compressed video data buffer 11 stores the compressed video data supplied from the AV separating section 2. The video decoder 12 executes analysis and an expanding process of attribute information of the compressed video data, e.g., video header information in response to a control signal from the AV synchronization processing section 5. The frame buffer 13 stores the expanded video data. The video display control section 14 controls the CRT monitor 6 to display the expanded video data stored in the frame buffer 13.

The audio data processing section 4 is composed of a compressed audio data buffer 21, an audio decoder 22, a PCM buffer 23, and an audio reproduction control section 24. The compressed audio data buffer 21 stores the compressed audio data supplied from the AV separating section 2. The audio decoder 22 executes analysis and an expanding process of attribute information of the compressed audio data, e.g., audio header information. The PCM buffer 23 stores the expanded audio data. The audio reproduction control section 24 controls the speaker 7 to output the expanded audio data stored in PCM buffer 23.

The AV synchronization processing section 5 is composed of an audio data counter 31, a clock generating section 32, a time stamp monitoring section 33, a frame difference counter 34, a frame rate generating section 35, a video frame counter 36, and an AV synchronization control section 37.

The audio data counter 31 counts a total amount of audio data which have been reproduced till the present time after start of the reproduction. The clock generating section 32 calculates a reproduction time or an audio reference time using the total amount of audio data and the audio header information. The time stamp monitoring section 33 detects a current time stamp from the video header information and calculates a time difference between the current stamp and a previous time stamp. The frame difference counter 34 counts the number of frames between the current time stamp and the previous time stamp in response to the detection of the time stamp by the monitoring section 33. The frame rate generating section 35 calculates a frame rate using the time difference and the frame difference. The video frame counter 36 counts the total number of frames of video data which have been expanded and displayed from the reproduction start to the present time, as an actual frame count. The AV synchronization control section 37 calculates the number of frames of the video data which should be originally expanded and displayed, as the target number of frames using the frame rate and the reference time. Then, the actual number of frames and the target number of frames are compared such that the progress of the reproduction of the video data to the reproduction of the audio data can be detected. Thus, the AV synchronization control section 37 sets the number of fields to be removed for a thin-down method and sets a video data expanding method for the next video data and outputs a control signal to the video data decoder 12.

Figure 3:
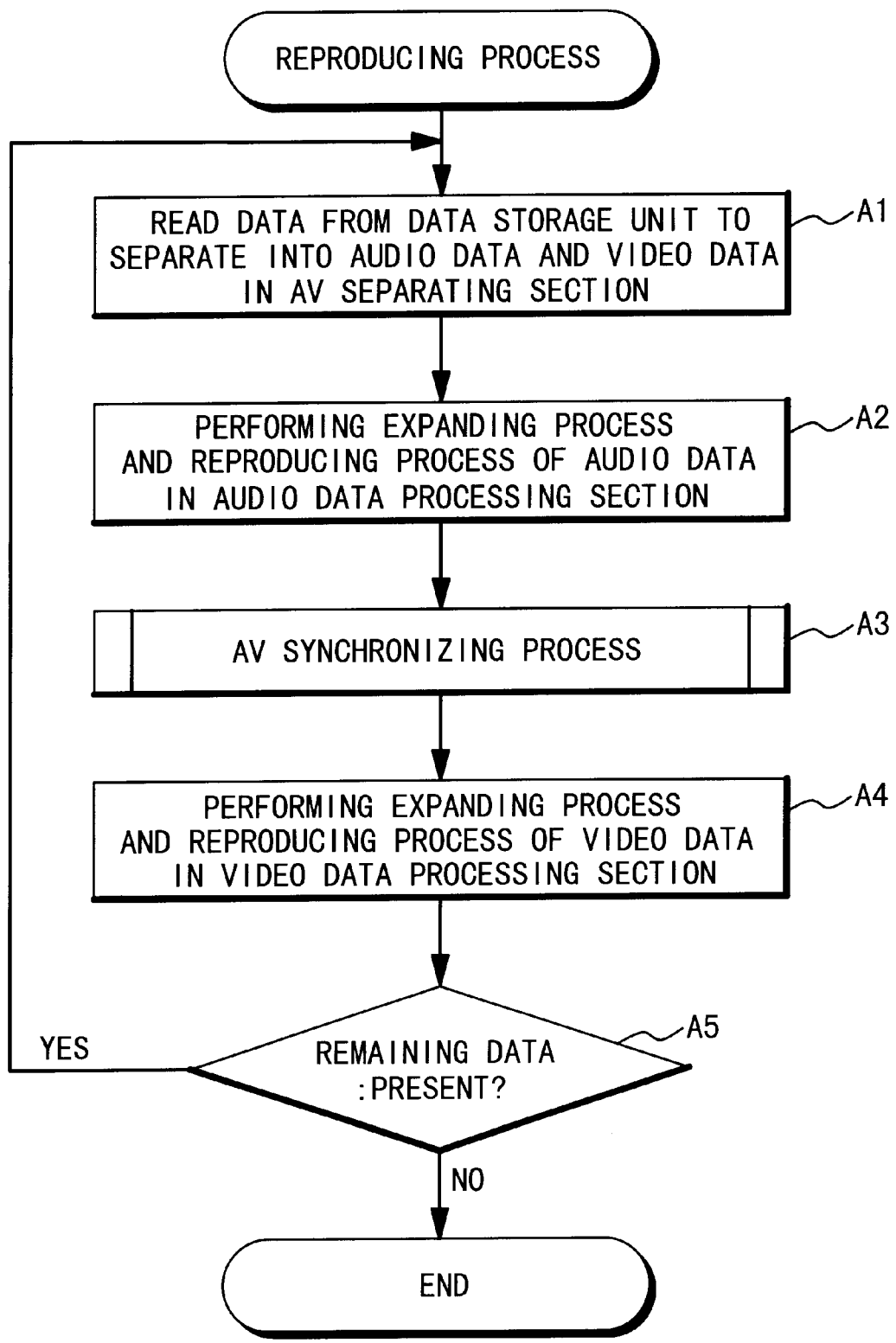
FIG. 3 is a flow chart to explain the procedure of the whole apparatus in the embodiment.

Next, the operation of the audio and video data synchronous reproduction apparatus in this embodiment will be described with reference to the flow chart of FIG. 3.

In a step A1, the AV separating section 2 reads a multiplexed compressed audio data and video data from the data storage unit 1 and separates into the compressed audio data and the compressed video data. Then, the AV separating section 2 stores the compressed video data in the compressed video data buffer 11 and stores the compressed audio data in the compressed audio data buffer 21.

In a step A2, the expanding process and reproducing process of the compressed audio data are performed. Also, at this time, the analysis of the audio header information is performed.

In a step A3, the AV synchronization process is performed to be later mentioned.

In a step A4, the expanding process and displaying process of the compressed video data are performed. Also, at this time, the analysis of the video header information is performed.

In a step A5, whether or not un-processed data is left in data storage unit 1 is determined. When any data is left, the control returns to the step A1. When any data is not left, the control stops the reproducing process.

Figure 4:
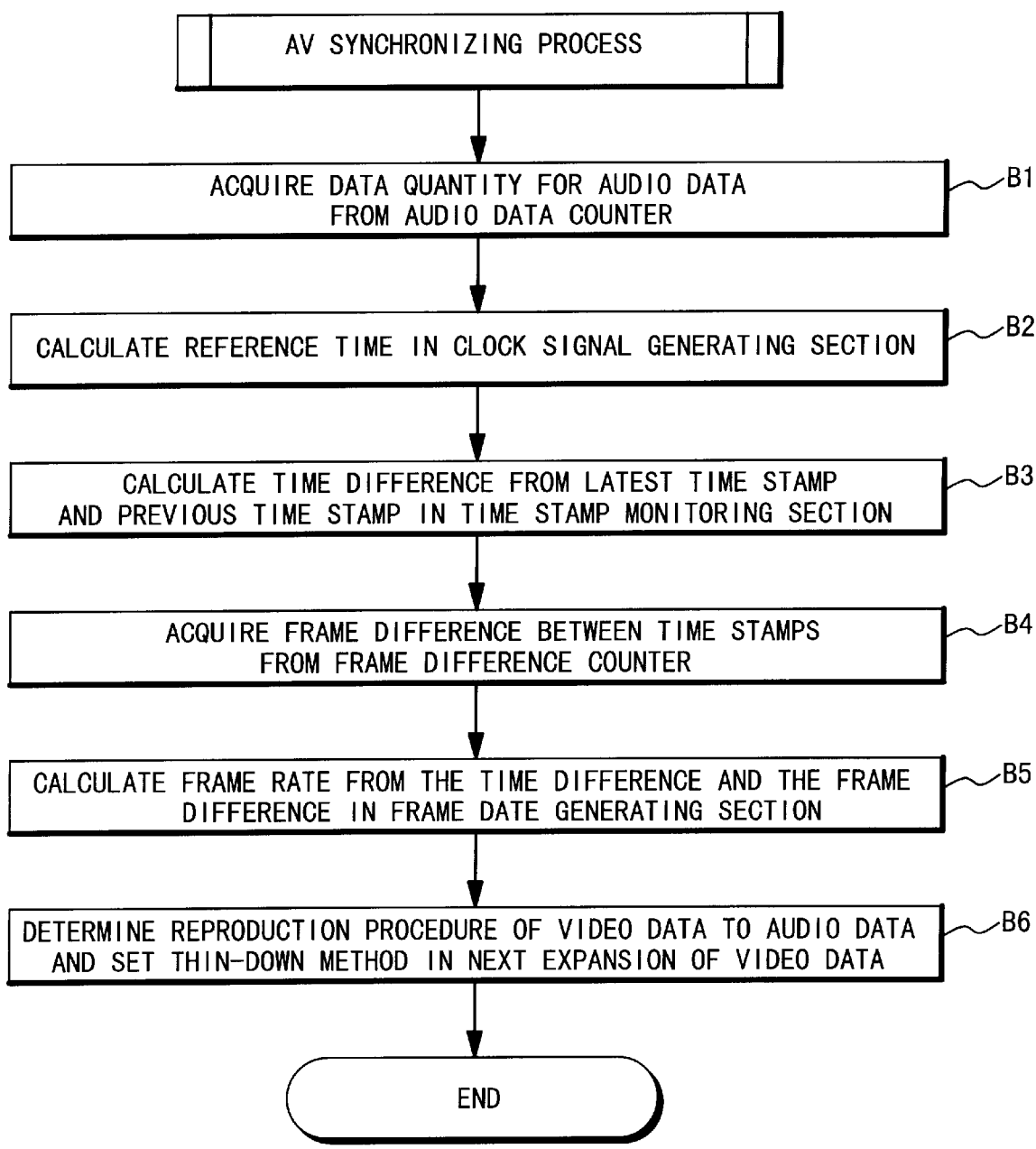
FIG. 4 is a flow chart to explain the procedure of an AV synchronization control.

Next, the AV synchronization control process (step A3) will be described in detail. FIG. 4 is a flow chart showing the procedure of the AV synchronization control.

In a step B1, the total amount of audio data to be reproduced is read from the audio data counter 31. In a step B2, the reproduction time of the audio data as the reference time is calculated using the audio header information and the total amount of reproduced audio data, in the clock generating section 32.

In a step B3, the time difference is calculated from the current time stamp and the previous time stamp in the time stamp monitoring section 33. In a step B4, the frame difference between the current and previous time stamps is read out from the frame difference counter 34.

In a step B5, in the frame rate generating section 35, a frame rate is calculated from the following equation (1) using the time difference and the frame difference:

$$(\text{frame rate}) = (\text{frame difference})/(\text{time difference}) \quad (1)$$

In a step B6, the target number of frames is calculated in the AV synchronization control section 37 using the reference time calculated in the step B2 and the frame rate calculated in the step B5. After that, the target number of frames and the actual number of frames are compared and the progress of the reproduction of the video data to the reproduction of the audio data is verified.

Next, the number of frames to be removed is set in accordance with the progress of this video data, a video data expanding method for the next frame is set.

Figure 5:
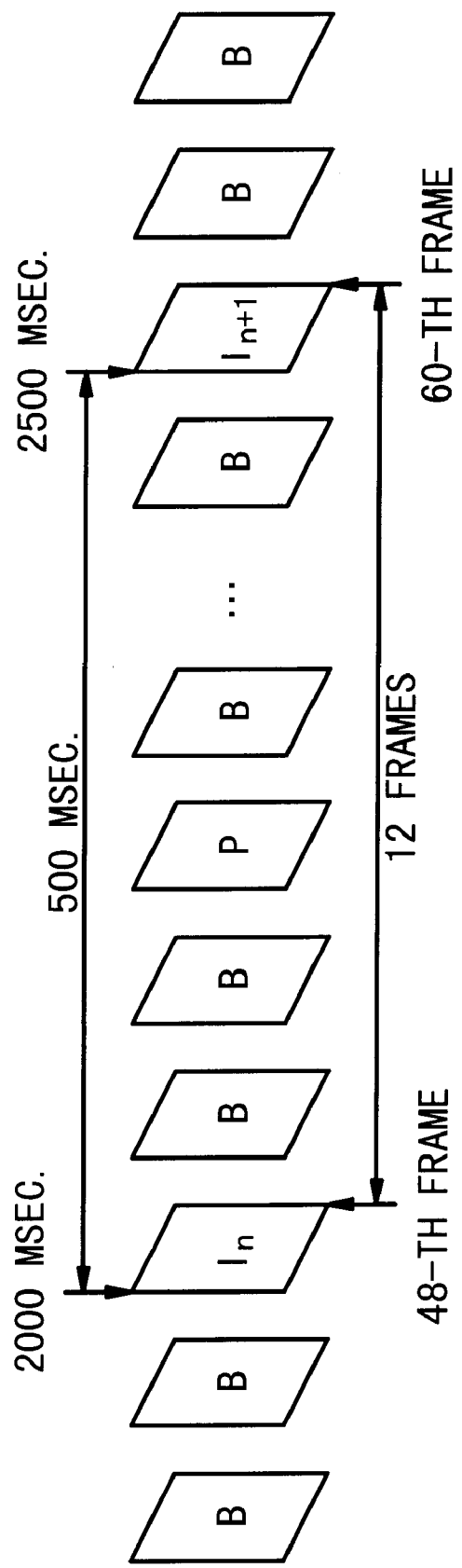
FIG. 5 is a diagram to explain a specific example of frame calculation.

Next, a method of calculating the frame rate for every key frame (I picture) will be described based on a specific example. FIG. 5 shows the specific example of the frame rate calculation.

In this example, because the 60th frame is a key frame ($I_{n+1}$ picture), the time stamp at 2500 ms of this frame is transmitted to the time stamp monitoring section 33. In the time stamp monitoring section 33, a time difference is determined using the current time stamp at 2500 ms and the previous time stamp at 2000 ms. In this example, the time difference is 500 ms (=2500 ms−2000 ms). Also, the frame difference counter 34 counts the frames detected after the previous key frame at the 48th frame to determine the frame difference. Therefore, when the $I_{n+1}$ picture at the 60th frame is detected, the frame differences is 12. At this time, the frame rate generating section 35 calculates the frame rate as follows, using the above equation (1).

frame rate=12 frames/500 ms=24 frames/sec.

The frame rate can be calculated in the present invention as above mentioned.

As described above, according to the present invention, the AV synchronization control can be correctly executed without using the frame rate which is written in the data, even when the time resolution of the reproducing apparatus is low. In this way, when the data subjected to 3:2 pull down is reproduced in the original 24 frames/sec in the non-interlace mode, the video data can be reproduced in synchronous with the reproduction of the audio data. Thus, the AV synchronization can be correctly adjusted.

Also, according to the present invention, the use of the calculated frame rate allows the correct AV synchronization control, even when the frame rate can not be normally acquired due to a transmission path error and a data error.

What is claimed is:

1. An apparatus for synchronously reproducing a video data and audio data, comprising:

a separating section separating a multiplexed compressed audio and video data into a compressed video data and a compressed audio data;

an audio data processing section expanding said compressed audio data to reproduce an audio data from the expanded audio data, and outputting the audio data;

a video data processing section expanding said compressed video data in response to a control signal to reproduce a video data from the expanded video data, and outputting a signal indicative of each of frames, and a signal indicative of each of time stamps; and a synchronization processing section calculating a frame rate based on said audio data supplied from said audio data processing section, and said frame signal and said time stamp signal supplied from said video data processing section, and outputting said control signal to said video data processing section based on said calculated frame rate without using a frame rate written in said video data.

2. An apparatus for synchronously reproducing a video data and audio data according to claim 1, wherein said synchronization processing section includes:

a time stamp monitoring section calculating a time difference between said two time stamps;

a frame difference counter counting a number of frames between said two time stamps;

a calculating section calculating said frame rate from the number of frame difference and said time difference; and a control section outputting said control signal to said video data processing section based on said calculated frame rate.

3. A method of synchronously reproducing a video data and audio data, comprising:

separating a multiplexed compressed audio and video data into a compressed video data and a compressed audio data;

expanding said compressed audio data to reproduce an audio data from the expanded audio data;

a video data processing section expanding said compressed video data in response to a control signal to reproduce a video data from the expanded video data;

generating a signal indicative of each of frames, and a signal indicative of each of time stamps; and calculating a frame rate based on said audio data, said frame signal and said time stamp signal;

generating said control signal based on said calculated frame rate without using a frame rate written in said video data.

4. A method according to claim 3, wherein said calculating includes:

calculating a time difference between said two time stamps;

counting a number of frames between said two time stamps; and calculating said frame rate from the number of frame difference and said time difference.

* * * * *